C. E. Collins.
Watch Key.
N° 66,798. Patented Jan. 16, 1867.

Witnesses:
Theo Tusche
J. A. Service

Inventor:
Chas. E. Collins
per Munn
Attorneys

United States Patent Office.

CHARLES E. COLLINS, OF SAN FRANCISCO, CALIFORNIA.

Letters Patent No. 66,798, dated July 16, 1867.

---

IMPROVEMENT IN COMBINED INSTRUMENTS FOR WATCHMAKERS' USE.

---

The Schedule referred to in these Letters Patent and making part of the same.

---

TO ALL WHOM IT MAY CONCERN:

Be it known that I, CHARLES E. COLLINS, of San Francisco, in the county of San Francisco, and State of California, have invented a new and useful Improvement in Instrument for Watchmakers' Use, combining gauges for springs, crystals, and pinions, &c.; and I do hereby declare that the following is a full, clear, and exact description thereof, which will enable others skilled in the art to make and use the same, reference being had to the accompanying drawings, forming part of this specification, in which—

Similar letters of reference indicate like parts.

This invention is designed to furnish a convenient instrument for the use of practical watchmakers, by the combination of a bench-key, a case-opener, and measuring-gauges for crystals, main-springs, and pinions, all conveniently arranged together in one article.

Figure 1:
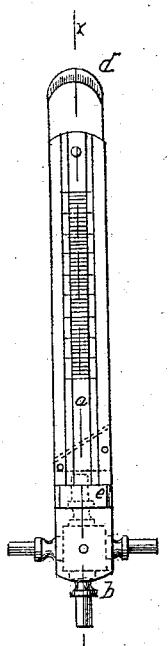
Figure 1 is a side view of my improved combined gauges when closed in the handle.
Figure 2:
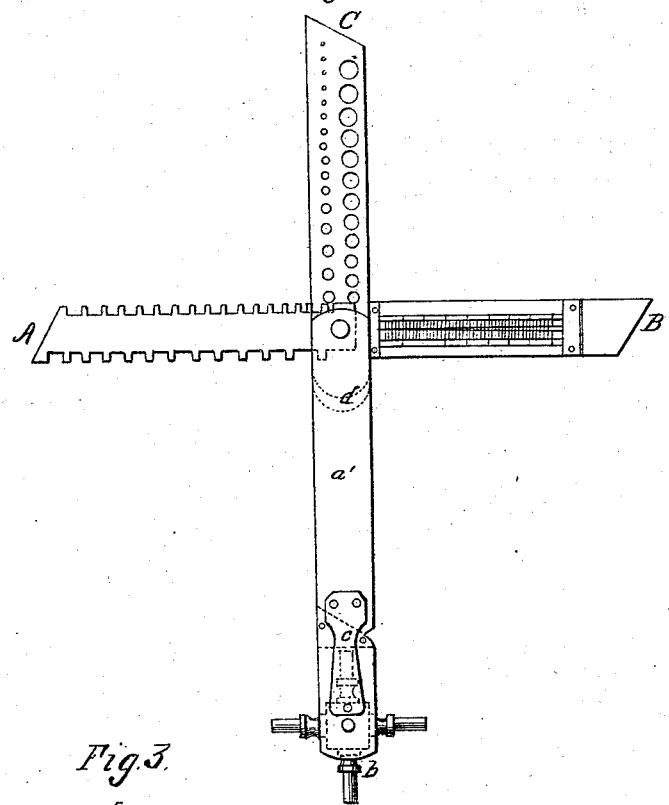
Figure 2 is a side view of the same when the gauges are spread open.
Figure 3:
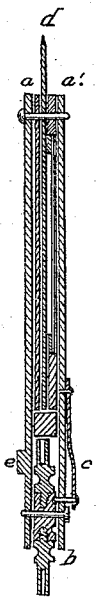
Figure 3 is a longitudinal section of the same, taken on the line $x\ x$ of fig. 1.

In fig. 2, A represents a gauge for measuring the width of main-springs of watches, B a gauge for measuring the thickness of main-springs, and C a gauge for measuring the size of the pinions for the wheels of watches, which are all pivoted at one end to the end of a handle formed of two flat sides $a\ a'$ made with open edges like a razor-handle, in which handles these gauges open and shut like knife-blades. At the other end of the handle is pivoted a revolving bench-key, $b$, the pipes of which are held in place, when used, by a flat spring, $c$, on the handle, which bears a pin down upon the hub of the key and steadies it by friction. On the end of the handle to which the gauges A B C are pivoted one of these gauges is projected to form a sharp-edged case-opener $d$, which will readily open a watch-case instead of using the thumb-nail for the purpose. Upon one of the sides of the handle is a scale of measurement for watch-crystals, as shown by fig. 1, with the projection $e$ for setting the edge of the glass against.

The individual parts forming this instrument are all constructed in the ordinary way for their use separately, and I disclaim them severally; but what I claim as my invention, and desire to secure by Letters Patent, is—

An improved instrument for watchmakers' use, formed by the combination of measuring-gauges for watch-crystals, main-springs, and wheel-pinions, a revolving bench-key, and a case-opener, all united and connected with one handle, substantially in the manner as herein described.

C. E. COLLINS.

Witnesses:
ALEX. F. ROBERTS,
J. M. COVINGTON.